Figure 1:
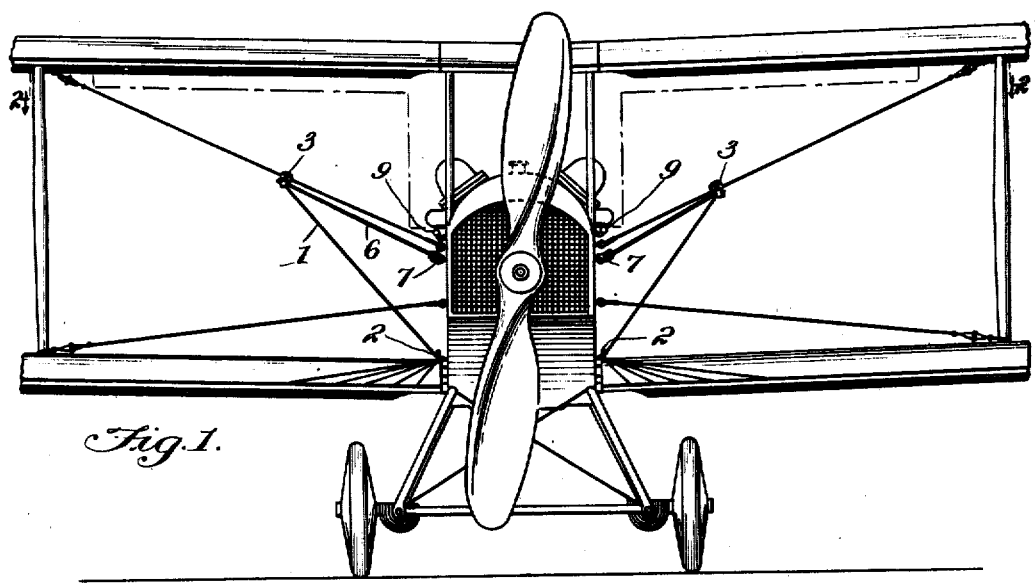

D. L. WEBSTER AND H. N. RUSSELL.
DRIFT SIGHT.
APPLICATION FILED JULY 29, 1919.

1,436,924.

Patented Nov. 28, 1922.

2 SHEETS—SHEET 1.

Inventor
David L. Webster
Henry N. Russell
By Robert F. Young
Attorney

Patented Nov. 28, 1922.

1,436,924

UNITED STATES PATENT OFFICE.

DAVID L. WEBSTER, OF BOSTON, MASSACHUSETTS, AND HENRY N. RUSSELL, OF PRINCETON, NEW JERSEY.

DRIFT SIGHT.

Application filed July 29, 1919. Serial No. 314,125.

*To all whom it may concern:*

Be it known that we, DAVID L. WEBSTER and HENRY N. RUSSELL, citizens of the United States, residing at Boston, county of Norfolk, State of Massachusetts, and Princeton, county of Mercer, State of New Jersey, respectively, have invented certain new and useful Improvements in Drift Sights, of which the following is a specification.

This invention relates to means for accurately determining and aiding in the correction for the drift of an airplane or other aircraft due to cross winds. The utility of a device of this character, or a drift sight as it may be termed, is two-fold. First, given a definite compass course to be actually made good over the ground, the course to be steered must differ from the course made good, the track, by an amount depending on the wind. If the wind is unknown, a previous calculation of the course to be steered is impossible. Even if known, a correct calculation would usually have to allow for changes in the strength and direction of the wind at different altitudes, times, and places. Even in the rare case of a uniform wind, the correction for drift by a simple sight is in practice easier than its calculation. Second, the drift sight may be used in checking a course by land marks identified at some distance ahead, or in flying by definite land marks instead of using a compass. When so used, it is essential that the sight be combined with a bearing or direction indicator capable of sighting on any object lying quite a distance on either side of the nose of the ship, say about 40 or 50 degrees. The bearing indicator can then be used as a mark by which to steer the ship accurately for the object to be passed over. In the present invention, the bearing indicator is a part of the sight itself and does not involve any second adjustment.

It is the purpose of this invention to overcome the several sources of error usually encountered in the taking of drift measurements. These are principally as follows:—

*Bumpy air.*—In order to overcome the effects of bumpy air, which renders the apparent motion of the earth irregular, the reference lines of the drift indicator on which measurement is taken must be long enough so that a single object on the ground may be followed for such a distance that apparent motion of the same, due to rolling one way, will be neutralized by rolling back again, and all such effects will average out. This makes it very difficult to get good results in bumpy air with a reference line in the form of a wire of such length that it can be set in a revolving circle and still be far enough from the operator's eye to be in focus. It is best however, to use a wire several feet long if possible. Even with such a wire, work is difficult below about one thousand feet of altitude.

*Slow rolling or yawing.*—The effect of slow rolling of the airplane, which gives an apparent motion that is steady for short intervals but in the wrong direction, is not troublesome to an observer measuring the drift but not piloting the ship. In piloting however, while measuring the drift, especially in bumpy air, the pilot is very likely to unconsciously begin to judge the level of the ship by the object on the ground and the reference line along which it is supposed to move. This gives him a tendency to roll the ship in such a way as to make the object move along the reference line and give an apparently steady drift at the wrong angle. This effect is increased by the partial loss of sense of balance on tipping his head forward to look down toward the ground directly below him. To eliminate this effect, it is thought best to guess the value of the drift angle, set the direction of the indicating wire on that angle and the ship level, and use the ailerons so as to make the object move along the wire. If the guess was wrong, the ship will soon be found to have rolled during this process. If the roll is to the right, the swinging end of the direction indicating wire should be moved to the right for the next trial and the process repeated.

*Side slip.*—Consideration of variable amounts of side slip due to lack of level of the ship during the drift measurement or in flying the course determined, is quite important. It is best of course, in order to obtain accurate measurements, to keep the wings level and the ship headed so as to make the proper track. But whether this is done or not, the drift angle will not be the same at different times unless the lateral level is the same. Hence the ship must be kept on the same lateral level during the drift measurement as during the rest of the flight, as in the ordinary type of machines, tipping the ship, say one degree, changes the drift by about two degrees at high speeds and four degrees at low speeds.

*Changes of air speed.*—Changes of air speed, which naturally change the amount of drift actually present, are unimportant if the drift itself is small either due to lack of wind or because the course is up or down the wind, but are quite important in a strong cross wind. In such cases, on the average the drift angle changes by about the same percentage as the speed but increases when the speed decreases. The air speed should therefore be kept fairly constant during the flight.

*Changes of wind during flight.*—Such changes at altitudes useful in cross country work, especially if the wind is strong, are common enough to make serious errors. Consequently, the drift should be measured often enough during a flight to prevent such errors.

Other and further objects of the invention will appear as the nature of the same is better understood from consideration of the following description taken in conjunction with the drawings, representing a preferred embodiment of the invention, and in which like numerals indicate the same parts throughout the several views.

Figure 2:
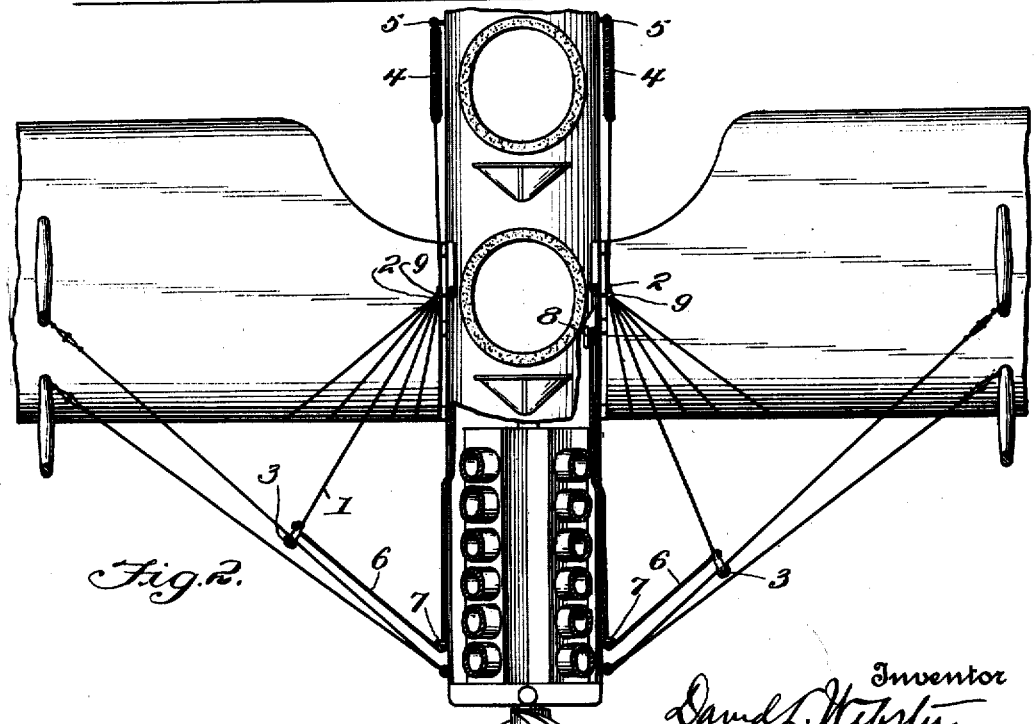
Figure 3:
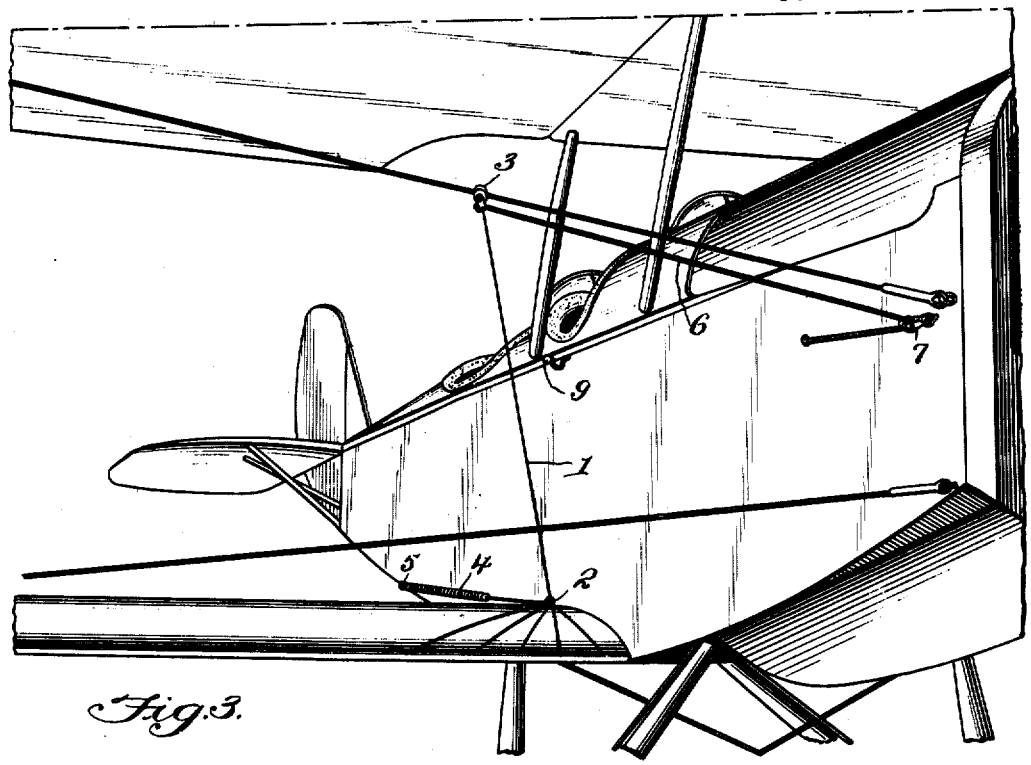
Figure 4:
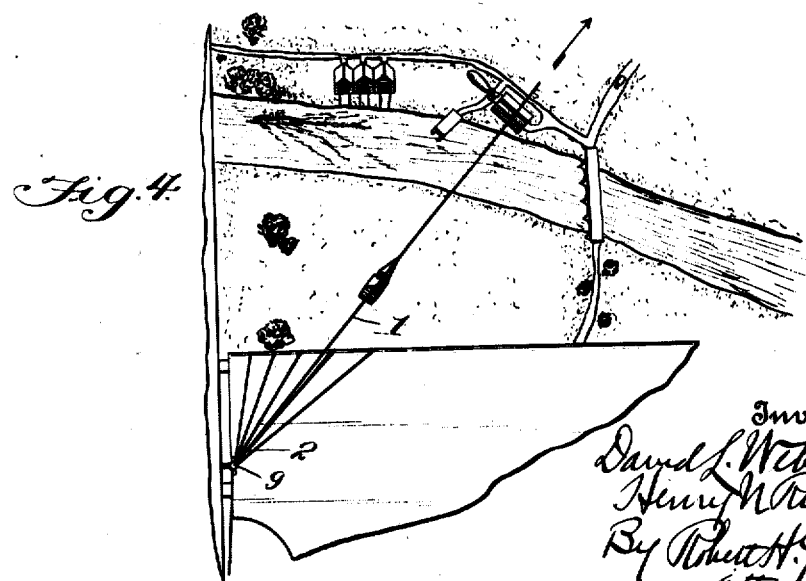

Fig. 1 represents a front elevational view of an airplane showing my invention as applied thereto, Fig. 2, a sectional view taken on line 2—2 of Fig. 1, Fig. 3, a perspective view showing more clearly the device as it appears on one side of the machine, and Fig. 4, a view taken from an airplane in flight, illustrating the device in use.

Referring to the drawings, it will be seen that the device is duplicated on either side of the fuselage of the airplane. This is necessary in order that the angle of drift may be taken on either side of the airplane whether the machine be drifting to one side or to the other. The device on one side of the fuselage only will be described, this description applying equally to the device on the opposite side.

A sighting wire 1 is suspended between the upper drift stay, that is the one running from the nose of the ship to the upper wing and the upper surface of the lower wing adjacent the fuselage. Here it passes through a screw eye 2, or some similar device, secured on the upper face of the wing directly under the place where the pilot would most naturally place his eye on leaning over to look along the side of the ship. A movable connection is provided between the upper end of sighting wire 1 and the drift stay to which it is attached in the form of a small pulley 3 mounted on the stay. In the ordinary type of machine, this would locate sighting wire 1 at a slant of about 45 degrees. In order to maintain the sighting wire taut, the end thereof which projects through screw eye 2 ends in a long spiral spring 4 which is fastened to the side of the fuselage at 5. Means are provided in the form of a line 6 running around a fixed pulley 7 on the nose of the ship and back to a cleat 8, or other suitable means, in the cock pit, whereby pulley 3, and thus sighting wire 1, can be pulled in toward the nose of the ship. Thus, line 6, acting in conjunction with the tension exerted by spring 4, affords means for adjusting sighting wire 1 from nearly zero angle with the fuselage, or the fore and aft line of the machine, to about 30 degrees or so from it, at which point the sighting wire becomes perpendicular to the drift stay. In order to move the sighting wire out beyond the number of degrees afforded at the aforementioned perpendicular position, an outhaul may be rigged. This arrangement however, would rarely be needed in high speed machines and then only in strong winds.

Radiating from screw eye 2 and on the upper surface of the lower wing, there is provided a series of lines arranged at uniform angle intervals and placed with reference to the fore and aft line of the machine. Directly over screw eye 2 and adjacent the edge of the cock-pit of the machine, is a button 9 which serves as a rear sight in reading the angle of drift.

In using the sight, the observer leans his head over the side of the fuselage toward which he is drifting with his eye approximately over the rear sight 9. No great accuracy in the position of the eye is required. The observer then sets sighting wire 1 so that, at a rough guess, the movement of the ground below seems to coincide with the wire when he heads the course he must take. A reading of the angle indicated by the sighting wire on the scale on the wing is then taken, following which the compass is corrected by the same amount. For example, if it is desired to make a course of two hundred and thirty degrees (to the right from north) and this first estimate of the drift is fifteen degrees to the right, then the course should be altered to two hundred and fifteen degrees. The drift is now liable to be slightly different from its value on the original course, but as the first estimate was merely a rough guess, no time is lost. The observer then makes a better determination, sets the sighting wire to the best guess he can make, sets the ship dead level at the proper air speed, and then holds the ship so that the line of the sighting wire on the ground stays fixed, except for bumps, on two objects on the ground that lie on it, as shown in Fig. 4. If the estimate is wrong, this process results in the pilot rolling the ship one way or the other in an effort to hold the line of the wire fixed. If he rolls to the right, he moves the sighting wire to the right, sets the ship level and tries again. With the new drift thus determined, he corrects his compass reading again. In the example given above, if his new drift is say twelve degrees to the right, his new course will be two hundred and eighteen degrees. Theoretically, the change from two hundred and fifteen to two hundred and eighteen degrees should change the drift again, but practically, if the first guess is good for anything, the second change is too small to measure in almost every case. The one precaution he must observe is to start each test of his drift with the wings of the ship level and going straight ahead at the speed he intends to hold.

Thus, having set the course by use of the drift sight, the pilot may very readily use it to hold the course and prevent errors due to changes of wind, by reason of the fact that the line of the sighting wire, as seen from over the back sight 9, extends nearly to the horizon and sometimes above it, thus showing him just what objects he will fly over. He then picks a distant land mark that lies on the sighting wire with his eye over the back sight 9, and looks at the object every few minutes in order to be sure it is still on the wire. If it is not, his drift measurement is wrong or else the wind has changed, and he must therefore set the sighting wire to a slightly different angle and change his course accordingly. This type of readjustment is the source of the extreme accuracy of this method of cross-country flying, and depends primarily on the use of a long sighting wire. Even if the air should be too bumpy for any accurate measurements by objects nearly below, this type of adjustment can still be made quite easily.

The accuracy obtainable with the sight in steering cross-country courses is about one degree, or steering by aid of the sight in strong variable winds, the airplane can be made to follow a course without leaving it by more than one mile in traveling sixty.

Although the invention has been shown in its preferred form and the details of construction thereof described more or less precisely, it is to be noted that any form of apparatus which utilizes long reference lines, either in the form of wires or partly wires and partly other marks on the airplane, and either fixed or movable and so placed that they can be used in sighting objects at considerable distances from the airplane as well as nearer to it, would answer the same purposes; further, that it is not intended that the scope of the invention be limited to the construction shown, as changes in form, the proportion of parts, and the substitution of equivalents, as circumstances may suggest or render expedient, may be made without departing from the spirit of the invention.

Although the sight has been described as being used from the pilot's cock-pit, it is desired to state that the same may be used in any position on an airplane or other aircraft from which it is desired to determine the angle of drift.

What we claim is:

1. A drift indicating device for aircraft, comprising in combination with a biplane, having a fixed angle-measuring graduated surface, a rear sight, and a direction indicating element extending from a point in line with said sight and adapted to be moved over said graduated surface and brought into coincidence with the path of flight of the craft.

2. A drift indicating device for aircraft, comprising in combination with a biplane, having a fixed angle-measuring graduated surface, a rear sight, a direction indicating element extending from a point in line with said sight and adapted to be moved over said graduated surface and brought into coincidence with the path of flight of the craft, and means for swinging said indicating element about said point.

3. A drift indicating device for aircraft, comprising in combination with a biplane, a rear sight, a flexible direction indicating element extending from a point in line with said sight and adapted to be brought into coincidence with the path of flight of the craft, means for swinging said indicating element about said point, angle measuring means associated with said sight, and means for holding said direction indicating element taut.

4. A drift indicating device for aircraft, comprising in combination with a biplane, a rear sight, a sighting wire connected for swinging movement to the lower aerofoil of said craft adjacent to the fuselage and extending to the upper drift stay, and means for swinging said sighting wire to change its angle to the longitudinal axis of the fuselage, the lower aerofoil having graduations radiating from a point in line with said rear sight to be read in connection with the sighting wire.

5. A drift indicator for aircraft comprising in combination with a fixed graduated surface of the aircraft, a sighting strip one end only of which is adapted to be shifted in relation to said graduated surface, and means for shifting the movable end of said sighting strip.

6. An aircraft having on a fixed surface thereof angle measuring lines radiating from a common point, a sighting strip having one end attached to the aircraft in line with said point, and means for shifting the other end of said sighting strip into coincidence with the path of flight of the aircraft.

In testimony whereof we affix our signatures.

DAVID L. WEBSTER.
HENRY N. RUSSELL.